(12) United States Patent
Murakami et al.

(10) Patent No.: US 7,159,690 B2
(45) Date of Patent: Jan. 9, 2007

(54) ELECTRIC POWER STEERING APPARATUS

(75) Inventors: Tetsuya Murakami, Nara (JP); Kousuke Yamanaka, Kashiwara (JP); Kensaku Nakamura, Kashiba (JP)

(73) Assignee: Koyo Seiko Co., Ltd., Osaka (JP)

( * ) Notice: Subject to any disclaimer, the term of this patent is extended or adjusted under 35 U.S.C. 154(b) by 0 days.

(21) Appl. No.: 10/866,182

(22) Filed: Jun. 14, 2004

(65) Prior Publication Data

US 2005/0016790 A1   Jan. 27, 2005

(30) Foreign Application Priority Data

Jun. 17, 2003  (JP)  ............................. 2003-172271

(51) Int. Cl.
*B62D 5/04*   (2006.01)
(52) U.S. Cl. .................................... 180/444
(58) Field of Classification Search ................ 74/390, 74/395, 409, 417, 440, 388 PS; 180/444
See application file for complete search history.

(56) References Cited

U.S. PATENT DOCUMENTS 6,155,376 A * 12/2000 Cheng ........................ 180/444
2002/0096389 A1 * 7/2002 Saruwatari et al. ......... 180/444
2004/0168849 A1 * 9/2004 Honaga et al. .............. 180/444

FOREIGN PATENT DOCUMENTS

JP   9-66844   3/1997

* cited by examiner

*Primary Examiner*—Tony Winner
(74) *Attorney, Agent, or Firm*—Rabin & Berdo, PC

(57) ABSTRACT

An electric power steering apparatus comprises a rack shaft movable in the axial direction. The rack shaft is meshed with a pinion rotated in response to the operation of a steering member. The rotation of the output shaft in an electric motor is decelerated by first and second gears which are meshed with each other. A motion conversion mechanism for converting the rotation of the second gear into the axial movement of the rack shaft comprises a rotating cylinder rotated in synchronization with the second gear and a screw shaft. The screw shaft is integrally provided coaxially with the rack shaft and is screwed into the rotating cylinder through a rolling member. A screw groove in the screw shaft and the teeth in the first gear are twisted in the same direction.

12 Claims, 1 Drawing Sheet

ELECTRIC POWER STEERING APPARATUS

BACKGROUND OF THE INVENTION

1. Field of the Invention

The present invention relates to an electric power steering apparatus of a rack-and-pinion type.

2. Description of Related Art

In a steering apparatus of a rack-and-pinion type that applies a manual operation force produced by operating a steering member to a rack shaft through a pinion shaft, there is an electric power steering apparatus that applies to a rack shaft a steering assist force produced by an electric motor.

There is provided an electric power steering apparatus of a so-called rack assist type comprising a speed reduction mechanism including a first bevel gear attached to an output shaft in an electric motor for steering assist and a second bevel gear arranged around a rack shaft and meshed with the first bevel gear and so adapted that the rotation of the second bevel gear is converted into the axial movement of the rack shaft through a ball screw mechanism (see Japanese Unexamined Patent Publication (KOKAI) No. 9-66844A (1997), for example).

In the above-mentioned electric power steering apparatus, a rotating force applied to the rack shaft from a pinion shaft and a rotating force applied to the rack shaft from a ball screw are exerted in opposite directions in such a manner that the direction in which a ball screw groove is twisted with respect to a ball screw shaft and the direction in which rack teeth are twisted with respect to the rack shaft are the same.

The output shaft in the electric motor is rotated in a first or second direction of rotation depending on the direction of operation of a steering member. The first bevel gear is moved in the direction in which backlash is decreased by a driving reaction force received by the first bevel gear from the second bevel gear when the output shaft is rotated in the first direction of rotation, while being moved in the direction in which the backlash is increased by the driving reaction force when the output shaft is rotated in the second direction of rotation.

On the other hand, the second bevel gear may, in some cases, be moved in the direction in which the backlash is decreased by a driving reaction force received by a ball nut from a screw shaft in the rack shaft when the output shaft is rotated in the first direction of rotation, while being moved in the direction in which the backlash is increased by the driving reaction force when the output shaft is rotated in the second direction of rotation.

In this case, the backlash becomes approximately zero when the output shaft is rotated in the first direction of rotation while the amount of increase in the backlash is increased when the output shaft is rotated in the second direction of rotation, so that mesh between both the bevel gears is violently changed (shifted). The shift in the mesh between both the bevel gears depending on the direction of rotation exerts a great effect on the gears. Particularly, the backlash becomes approximately zero, so that smoothness in the mesh between both the bevel gears is lost, and durability in the mesh is reduced.

Generally, it is preferable that the bevel gear uses not straight teeth but oblique teeth or curved teeth in order to ensure its strength and smoothness in the mesh. If diagonal teeth or curved teeth are used, however, the above-mentioned problem is easily exposed depending on the setting of an angle at which the axes of both the bevel gears cross each other and a speed reduction ratio therebetween.

An object of the present invention is to provide an electric power steering apparatus capable of always ensuring proper backlash between gears for transmission which are meshed with each other and capable of improving smoothness and durability in the mesh.

SUMMARY OF THE INVENTION

In order to attain the above-mentioned object, in one mode of the present invention, there is provided an electric power steering apparatus comprising a pinion provided in a shaft rotated in response to the operation of a steering member, and a rack shaft including rack teeth meshed with the pinion and movable in the axial direction. The electric power steering apparatus comprises an electric motor for steering assist including an output shaft; a speed reduction mechanism including a first gear connected to the output shaft in the electric motor and a second gear meshed with the first gear; and a motion conversion mechanism for converting the rotation of the second gear into the axial movement of the rack shaft. The motion conversion mechanism comprises a rotating cylinder rotated in synchronization with the second gear and a screw shaft integrally provided coaxially with the rack shaft and screwed into the rotating cylinder through a rolling member. The screw shaft includes a screw groove, the first gear includes teeth, and the screw groove in the screw shaft and the teeth in the first gear are twisted in the same direction.

In the present mode, when the first gear is moved in the direction in which backlash is decreased with respect to the second gear irrespective of the direction of rotation of the output shaft in the electric motor, the second gear is moved in the direction in which the backlash is increased with respect to the first gear.

Conversely, when the first gear is moved in the direction in which the backlash is increased, the second gear is moved in the direction in which the backlash is decreased. Therefore, proper backlash can be always ensured between the first and second gears irrespective of the direction of rotation of the output shaft in the electric motor. As a result, it is possible to improve smoothness and durability in the mesh between the first and second gears.

DETAILED DESCRIPTION OF THE PREFERRED EMBODIMENT

Figure 1:
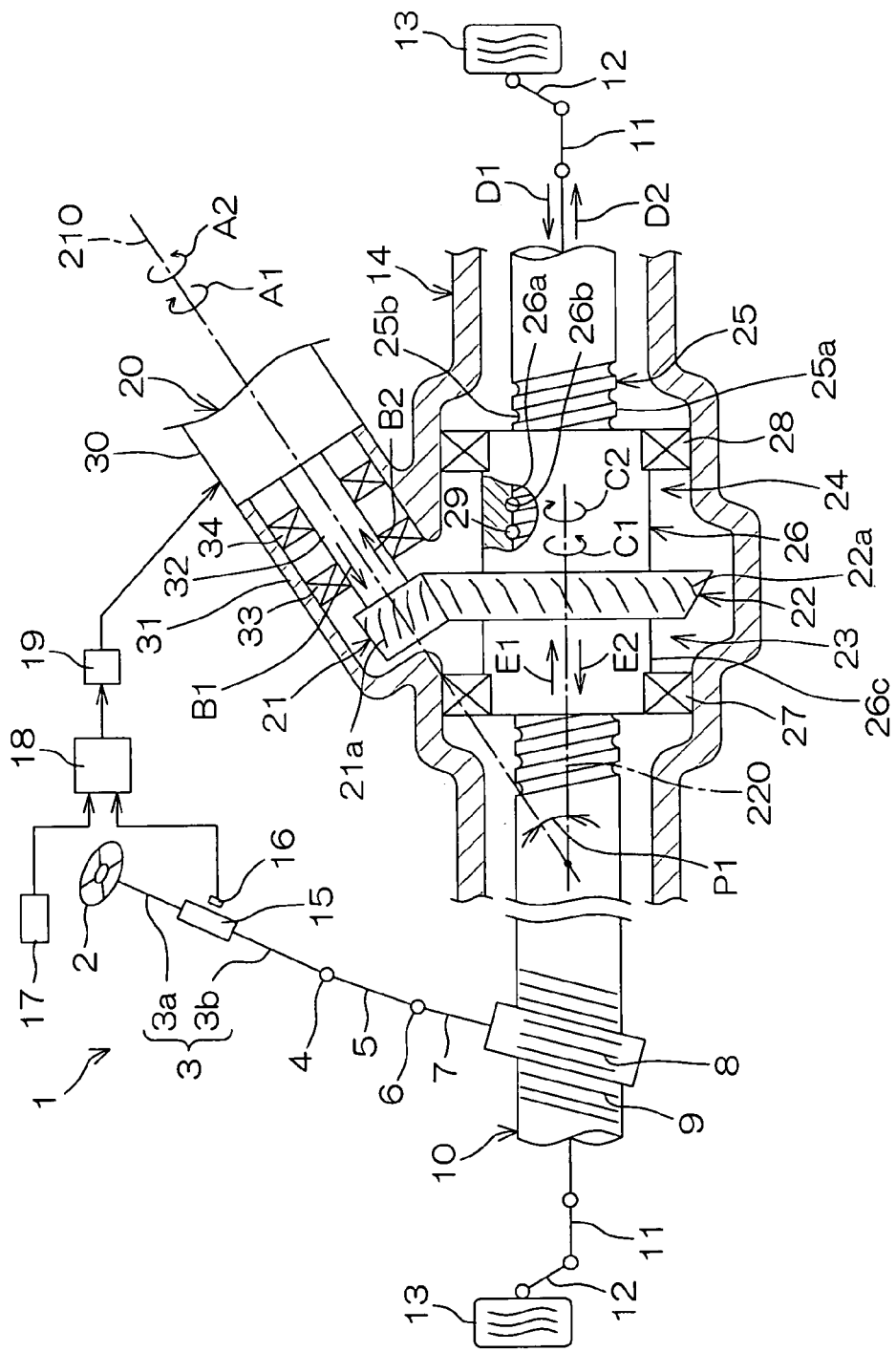
FIG. 1 is a schematic view showing the schematic configuration of an electric power steering apparatus according to an embodiment of the present invention.

An embodiment of the present invention will be described while referring to the accompanying drawings.

FIG. 1 is a schematic view showing the schematic configuration of an electric power steering apparatus according to an embodiment of the present invention. Referring to FIG. 1, an electric power steering apparatus (EPS) 1 comprises a steering shaft 3 connected to a steering member 2 such as a steering wheel, an intermediate shaft 5 connected to the steering shaft 3 through a universal joint 4, a pinion shaft 7 connected to the intermediate shaft 5 through a universal joint 6, and a rack shaft 10 having rack teeth 9 meshed with a pinion 8 provided at a front end of the pinion shaft 7 and extending in a rightward and leftward direction of a vehicle.

Tie rods 11 are respectively coupled to a pair of ends of the rack shaft 1, and each of the tie rods 11 is connected to a corresponding wheel 13 through a corresponding knuckle arm 12. The rack shaft 10 is supported so as to be movable in the axial direction by a rack housing 14 through a bearing (not shown). A rack shaft supporting device, which is not illustrated, is provided on the opposite side of the pinion 8 with the rack shaft 10 interposed therebetween. The rack shaft supporting device restrains the rotation of the rack shaft 10 while allowing the axial movement of the rack shaft 10, and presses the rack shaft 10 against the pinion 8 to restrain backlash in the mesh between the rack shaft 10 and the pinion 8.

When the steering member 2 is operated to rotate the steering shaft 3, the rotation is converted into the linear motion of the rack shaft 10 in the rightward and leftward direction of the vehicle by the pinion 8 and the rack teeth 9. Consequently, the steering of the wheel 13 is achieved.

The steering shaft 3 is divided into an input shaft 3a connecting with the steering member 2 and an output shaft 3b serving as a shaft to be moved connecting with the pinion shaft 7. The input shaft 3a and the output shaft 3b are coaxially connected to each other through a torsion bar 15.

There is provided a torque sensor 16 for sensing a steering torque by an amount of relative rotational displacement between the input shaft 3a and the output shaft 3b through the torsion bar 15. The results of the sensing of the torque by the torque sensor 16 and the results of the sensing of the speed of the vehicle from a vehicle speed sensor 17 are given to a control section 18 composed of an electric control unit (ECU), for example.

In the control section 18, the driving of an electric motor 20 for steering assist is controlled through a driving circuit 19 on the basis of the results of the sensing of the torque, the results of the sensing of the speed of the vehicle, and so on. The output rotation of the electric motor 20 is converted into the axial movement of the rack shaft 10 through a speed reduction mechanism 23 including first and second bevel gears 21 and 22, for example, and a motion conversion mechanism 24 composed of a ball screw mechanism, for example. As a result, steering assistance is achieved. The first and second bevel gears 21 and 22 are respectively composed of spiral bevel gears.

Specifically, a screw shaft 25 is formed in an intermediate part in the axial direction of the rack shaft 10, and a rotating cylinder 26 composed of a ball nut, for example, concentrically surrounds the screw shaft 25. The rotating cylinder 26 is rotatably supported on the rack housing 14 through a pair of bearings 27 and 28, and the corresponding movement in the axial direction is regulated by the bearings 27 and 28.

A plurality of rolling members 29 such as balls are interposed between a helical screw groove 25b on an outer periphery 25a of the screw shaft 25 and a helical screw groove 26b on an inner periphery 26a of the rotating cylinder 26, and the rotating cylinder 26 is screwed into the screw shaft 25 through the rolling member 29. Further, the rolling member 29 is circulated in the screw grooves 25b and 26b using a well-known mechanism (not shown).

A motor housing 30 in the electric motor 20 is fixed to an end of a cylindrical connecting housing 31 connected to the rack housing 14 in a crossing shape. An output shaft 32 in the electric motor 20 is rotatably supported on the connecting housing 31 through a pair of bearings 33 and 34.

The first bevel gear 21 in the speed reduction mechanism 23 is fixed so as to be integrally rotatable to a front end of the output shaft 32. Further, the second bevel gear 22 is fixed so as to be integrally rotatable to an outer peripheral surface 26c of the rotating cylinder 26. An angle P1 at which an axis of rotation 210 of the first bevel gear 21 and an axis of rotation 220 of the second bevel gear 22 cross each other is set to not less than 20 degrees and is less than 90 degrees, for example.

Teeth 21a to be meshed with the teeth 22a in the second bevel gear 22 are formed on a side surface in a conical tapered shape of the first bevel gear 21. Curved teeth are preferably used as the teeth 21a and 22a in the first and second bevel gears 21 and 22, and the directions of twisting of their shapes are opposite to each other.

The present embodiment is characterized by the following. That is, the direction in which the teeth 21a in the first bevel gear 21 are twisted and the direction in which the screw groove 25b in the screw shaft 25 is twisted are set to the same direction. When the screw shaft 25 is a right screw, for example, the teeth 21a in the first bevel gear 21 are also twisted, similarly to the right screw. When the screw shaft 25 is a left screw, the teeth 21a in the first bevel gear 21 are also twisted, similarly to the left screw. In such a way, proper backlash can be always ensured between the first and second bevel gears 21 and 22 irrespective of the direction of rotation of the output shaft 32 in the electric motor 20.

Specifically, description is made in conformity with a case where the teeth 21a in the first bevel gear 21 are twisted rightward and the screw groove 25b in the screw shaft 25 is also twisted rightward, as shown in FIG. 1. When the output shaft 32 in the electric motor 20 is rotated in a clockwise direction A1, the first bevel gear 21 receives a driving reaction force from the second bevel gear 22. However, a component on the axis of rotation 210 of the driving reaction force is exerted in a direction diagonally down to the left B1 (toward a front end of the output shaft 32) which is the direction in which the backlash between both the bevel gears 21 and 22 is decreased. The first bevel gear 21 is moved in the direction in which the backlash is decreased (in the direction diagonally down to the left B1) by a slight amount of backlash produced by an internal clearance between the bearings 33 and 34 which support the output shaft 32, for example.

On the other hand, at this time, the second bevel gear 22 and the rotating cylinder 26 are rotated in a counter-clockwise direction C1. Therefore, the screw shaft 25 and the rack shaft 10 which are screwed together through the screw groove 25a in the right screw are driven in a leftward direction D1 in FIG. 1. Therefore, a driving reaction force received by the rotating cylinder 26 from the screw shaft 25 is exerted in a rightward direction E1. Consequently, the second bevel gear 22 receives the driving reaction force from the screw shaft 25 through the rotating cylinder 26 in the direction in which the backlash between both the bevel gears 21 and 22 is increased. The second bevel gear 22 is moved in the direction in which the backlash is increased (in the rightward direction E1) by slight amounts of backlash in screwing the rotating cylinder 26 and the screw shaft 25 together through the rotating member 29 and backlash produced by an internal clearance between the bearings 27 and 28 which support the rotating cylinder 26.

Conversely, when the output shaft 32 in the electric motor 20 is rotated in a counter-clockwise direction A2, the component on the axis of rotation 210 of the driving reaction force received by the first bevel gear 21 from the second bevel gear 22 is exerted in the direction in which the backlash between both the bevel gears 21 and 22 is increased (in a direction diagonally up to the right B2). On the other hand, the second bevel gear 22 and the rotating cylinder 26 are rotated in a clockwise direction C2, so that the screw shaft 25 and the rack shaft 10 are driven in a rightward direction D2. Therefore, the second bevel gear 22 receives a driving reaction force in a leftward direction E2 which is the direction in which the backlash is decreased through the rotating cylinder 26 from the screw shaft 25.

In the foregoing manner, when one of the first bevel gear 21 and the second bevel gear 22 is moved in the direction in which the backlash is decreased (in the direction diagonally down to the left B1 or in the leftward direction E2) irrespective of the direction of rotation of the output shaft 32 in the electric motor 20, the other bevel gear is moved in the direction in which the backlash is increased (in the rightward direction E1 or in the direction diagonally up to the right B2), thereby making it possible to always ensure proper backlash between the first and second bevel gears 21 and 22. As a result, it is possible to improve smoothness and durability in the mesh between both the bevel gears 21 and 22.

The same results are obtained even in a case where the teeth 21a in the first bevel gear 21 are twisted leftward and the screw groove 25b in the screw shaft 25 is also twisted leftward.

In the present embodiment, it is preferable that the rack teeth 9 in the rack shaft 10 and the screw groove 25b in the screw shaft 25 are twisted in opposite directions, as shown in FIG. 1. In this case, the backlash in the mesh between the rack teeth 9 and the pinion 8 cancels the backlash in screwing the rotating cylinder 26 and the screw shaft 25 together and the backlash produced by the internal clearance between the bearings 27 and 28 which support the rotating cylinder 26, thereby making it possible to improve a steering feeling.

That is, when the rack shaft 10 attempts to rotate by a slight amount due to rack-and-pinion backlash, a movement force to move the rack shaft 10 in the opposite direction to the direction of steering is produced as the rack shaft 10 rotates. However, the movement force is canceled by a movement force to move the rack shaft 10 due to a steering assist force received by the screw shaft 25.

In the present embodiment, curved teeth are used as the teeth 21a and 22a in the first and second bevel gears 21 and 22, thereby making it possible to improve a contact ratio to reduce noise. Further, the use of the curved teeth makes it possible to obtain a highly precise gear. Particularly, it is preferable because the effects can be achieved without changing the peripheral structure, the assembling process, and so on.

The present invention is not limited to the above-mentioned embodiment. For example, the above-mentioned ball screw mechanism may be replaced with a well-known bearing screw mechanism as the motion conversion mechanism 24.

While the invention has been described in detail with respect to specific embodiments thereof, it will be appreciated that those skilled in the art, upon attaining an understanding of the foregoing, may readily conceive of alterations to, variations of, and equivalents to these embodiments. Accordingly, the scope of the present invention should be assessed as that of the appended claims and any equivalents thereto.

This application corresponds to Japanese patent application No. 2003-172271 filed with the Japanese Patent Office on Jun. 17, 2003, the disclosure thereof being incorporated herein by reference.

What is claimed is:

1. An electric power steering apparatus comprising a pinion provided in a shaft rotated in response to an operation of a steering member, and a rack shaft including rack teeth meshed with the pinion and movable in an axial direction, the electric power steering apparatus further comprising:
    an electric motor for steering assist including an output shaft;
    a speed reduction mechanism including a first gear connected to the output shaft in the electric motor and a second gear meshed with the first gear; and
    a motion conversion mechanism for converting the rotation of the second gear into an axial movement of the rack shaft,
    wherein the motion conversion mechanism comprises a rotating cylinder rotated in synchronization with the second gear and a screw shaft integrally provided coaxially with the rack shaft and screwed into the rotating cylinder through a rolling member,
    the screw shaft includes a screw groove,
    the first gear includes teeth, and
    a shape of the screw groove in the screw shaft and a shape of the teeth in the first gear are twisted in shape in a same direction relative to the respective axes when viewing the axes from similar view points, so that when the screw groove is a right-hand groove, the teeth of the first gear will be right-hand teeth, and when the screw groove is a left-hand groove, the teeth of the first gear will be left-hand teeth.

2. The electric power steering apparatus according to claim 1, wherein
    in a case where either one of the first and second gears is displaced in a direction in which backlash therebetween is decreased, the other gear is displaced in a direction in which the backlash is increased.

3. The electric power steering apparatus according to claim 1, wherein
    the rack teeth in the rack shaft and the screw groove in the screw shaft are twisted in shape in opposite directions.

4. The electric power steering apparatus according to claim 1 wherein
    the speed reduction mechanism includes a bevel gear mechanism,
    the first gear includes a first spiral bevel gear, and
    the second gear includes a second spiral bevel gear.

5. The electric power steering apparatus according to claim 4, wherein
    an angle at which an axis of rotation of the first spiral bevel gear and an axis of rotation of the second spiral bevel gear cross each other is not less than 20 degrees and is less than 90 degrees.

6. The electric power steering apparatus according to claim 4, wherein
    the teeth in the first spiral bevel gear and the teeth in the second spiral bevel gear are twisted in shape in opposite directions.

7. The electric power steering apparatus according to claim 1, wherein
    the second gear is fixed so as to be integrally rotatable to an outer peripheral surface of the rotating cylinder.

8. The electric power steering apparatus according to claim 7, wherein
    the first gear is provided so as to be integrally rotatable at an end of the output shaft in the electric motor.

9. The electric power steering apparatus according to claim 1, wherein
    the motion conversion mechanism includes a ball screw mechanism,
    the rotating cylinder includes a ball nut surrounding the screw shaft, and
    the rolling member includes a ball.

10. The electric power steering apparatus according to claim 1, further comprising
a rack housing accommodating the rack shaft so as to be slidable in the axial direction,
the rotating cylinder being rotatably supported on the rack housing through a pair of bearings.

11. The electric power steering apparatus according to claim 1, wherein
the electric motor includes a motor housing, and the motor housing is fixed to a connecting housing connected to the rack housing in a crossing shape.

12. The electric power steering apparatus according to claim 11, wherein
the output shaft in the electric motor is rotatably supported on the connecting housing through a pair of bearings.

* * * * *